United States Patent
Asada et al.

[11] Patent Number: 5,842,550
[45] Date of Patent: Dec. 1, 1998

[54] RELEASE DEVICE FOR A PULL-TYPE CLUTCH

[75] Inventors: Masaaki Asada, Ibaraki; Toshiya Kosumi, Kadoma, both of Japan

[73] Assignee: Exedy Corporation, Osaka, Japan

[21] Appl. No.: 724,094

[22] Filed: Sep. 30, 1996

[30] Foreign Application Priority Data

Nov. 29, 1995  [JP]  Japan .................................. 7-310369

[51] Int. Cl.⁶ .................................................. F16D 13/00
[52] U.S. Cl. ...................... 192/89.24; 192/98; 192/110 B
[58] Field of Search ............................ 192/89.23, 89.24, 192/98, 110 B, 70.27, 110 R

[56] References Cited

U.S. PATENT DOCUMENTS

| | | | |
|---|---|---|---|
| 1,431,551 | 10/1922 | White ................................... | 192/110 B |
| 3,741,361 | 6/1973 | Brandenstein ......................... | 192/98 X |
| 3,948,371 | 4/1976 | Lonne ..................................... | 192/98 |
| 3,951,244 | 4/1976 | Neder ..................................... | 192/98 |
| 4,305,492 | 12/1981 | Mori et al. ............................. | 192/98 |
| 4,565,272 | 1/1986 | Miyahara ................................ | 192/98 |
| 4,739,867 | 4/1988 | Harrington ............................. | 192/98 |
| 4,903,807 | 2/1990 | Kabayama . | |

FOREIGN PATENT DOCUMENTS 18 14 172  6/1970  Germany .
37 13 102  4/1987  Germany .

Primary Examiner—Charles A. Marmor
Assistant Examiner—Saúl Rodriguer
Attorney, Agent, or Firm—Shinjyu An Intellectual Property Firm

[57] ABSTRACT

A release device (3) is arranged around a main input shaft of a transmission, is provided for pulling an inner peripheral portion of a diaphragm spring (9) toward a transmission so as to disengage a clutch (2), and includes a second sleeve (12), a first lever plate (16) and a second lever plate (17). The second sleeve (12) is axially movably. The first lever plate (16) is an annular member, which is fixed to an outer periphery of the second sleeve (12) and has a spherical convex surface (16a) opposed to a transmission. The second lever plate (17) is an annular member, which has a spherical concave surface (17a) in slidable contact with the spherical convex surface (16a) and is in contact with an inner peripheral end of the diaphragm spring (9).

5 Claims, 2 Drawing Sheets

RELEASE DEVICE FOR A PULL-TYPE CLUTCH

BACKGROUND OF THE INVENTION

A. Field of the Invention

The present invention relates to a release device for a pull-type clutch which includes a mis-alignment correcting device which reduces stress concentration in a clutch mechanism where transmission shaft misalignment is present.

B. Description of the Background Art

In a conventional pull-type clutch provided with a clutch disk assembly and a clutch cover assembly, a diaphragm spring pushes a pressure plate toward a flywheel, so that a clutch disk is held between the pressure plate and the flywheel. When a release device pulls an inner peripheral portion of the diaphragm spring toward a transmission, the clutch disk is released to rotate freely with respect to the pressure plate and the flywheel.

A release device used in the pull-type clutch described above, generally includes a cylindrical member which is axially movable arranged around an input shaft of the transmission, a lever plate which is fixed at one end of the cylindrical member and is in contact with a surface of the inner peripheral portion of the diaphragm spring between the flywheel and the diaphragm spring, and a release bearing fixed to a portion of the cylindrical member. When the release bearing moves toward the transmission, the cylindrical member and the lever plate axially move together with the cylindrical member, so that lever portions of the diaphragm spring are pulled toward the transmission. Thereby, the clutch is disengaged.

In the conventional release device for the pull-type clutch, when there is a misalignment where the transmission input shaft is inclined with respect to the clutch and/or the flywheel, a local or shifted load is applied to the lever plate and the diaphragm spring, resulting in reduction in durability of these members. In other words, there may be a concentration of stress where the one portion of the lever plate may impart a greater amount of load to the diaphragm spring than other portions of the lever plate. Such misalignment may cause pedal vibration and uneven wear of the clutch mechanism.

SUMMARY OF THE INVENTION

One object of the present invention is to provide a release device for a pull-type clutch with the means to reduce the undesirable effect of misalignment between a release device and a clutch.

In accordance with one aspect of the present invention, a release device for a pull-type clutch includes an axially moveable cylindrical member having first and second ends and a first annular lever plate restrained against axial movement with respect to an outer periphery of the first end of the cylindrical member, the first annular lever plate having a spherical convex surface. The release device also includes a second annular lever plate having a spherical concave surface in slidable contact with the spherical convex surface, the second annular lever plate being restrained against axial movement proximate the first end of the cylindrical member. A bearing is disposed at the second end of the cylindrical member.

Preferably, the release device also includes a clutch cover having a diaphragm spring, wherein the cylindrical member extends through a central portion of the diaphragm spring and the first and second annular lever plates are confined against axial movement between the first end of the cylindrical member and the diaphragm spring.

Preferably, the release device also includes a flywheel defining a central axis and a clutch cover having a diaphragm spring, the clutch cover being connected to the flywheel, wherein the cylindrical member extends through a central portion of the diaphragm spring and the first and second annular lever plates are confined against axial movement between the first end of the cylindrical member and the diaphragm spring with the first and second annular lever plates disposed between the flywheel and the diaphragm spring.

Preferably, the spherical concave surface and the spherical convex surface have a center point which is defined generally along the central axis of the flywheel and the center point lies axially inside the flywheel.

In accordance with another aspect of the present invention, a release device for a pull-type clutch includes an axially moveable cylindrical member having first and second ends, and a first annular lever plate restrained against axial movement with respect to an outer periphery of the first end of the cylindrical member, the first annular lever plate having a spherical convex surface. The release device also includes a second annular lever plate having a spherical concave surface in slidable contact with the spherical convex surface, the second annular lever plate being restrained against axial movement proximate the first end of the cylindrical member. A clutch cover having a diaphragm spring is configured such that the cylindrical member extends through a central portion of the diaphragm spring and the first and second annular lever plates are confined against axial movement between the first end of the cylindrical member and the diaphragm spring. A bearing is disposed at the second end of the cylindrical member.

Preferably, the release device also includes a flywheel defining a central axis, the clutch cover being connected to the flywheel, and the first and second annular lever plates are disposed between the flywheel and the diaphragm spring.

Preferably, the spherical concave surface and the spherical convex surface have a center point which is defined along the central axis of the flywheel and the center point lies axially inside the flywheel.

In yet another aspect of the present invention, a release device for a pull-type clutch includes an axially moveable cylindrical member having first and second ends, and a first annular lever plate restrained against axial movement with respect to an outer periphery of a first end of the cylindrical member, the first annular lever plate having a spherical convex surface. A second annular lever plate having a spherical concave surface is in slidable contact with the spherical convex surface, the second annular lever plate being restrained against axial movement proximate the first end of the cylindrical member. The release device is used with a flywheel which defines a central axis. A clutch cover having a diaphragm spring is connected to the flywheel. The cylindrical member extends through a central portion of the diaphragm spring and the first and second annular lever plates are confined against axial movement between the first end of the cylindrical member and the diaphragm spring with the first and second annular lever plates disposed between the flywheel and the diaphragm spring. The spherical concave surface and the spherical convex surface have a center point which is defined along the central axis of the flywheel and the center point lies axially inside the flywheel. A bearing is disposed at the second end of the cylindrical member.

In this device, if the transmission input shaft or the like is inclined with respect to the clutch or flywheel, the first lever plate of the release device slides with respect to the second lever plate to correct misalignment. This suppresses a local load from being applied to the lever plate and the diaphragm spring, and also suppresses pedal vibration.

The foregoing and other objects, features, aspects and advantages of the present invention will become more apparent from the following detailed description, when taken in conjunction with the accompanying drawings.

DESCRIPTION OF THE PREFERRED EMBODIMENTS

Figure 1:
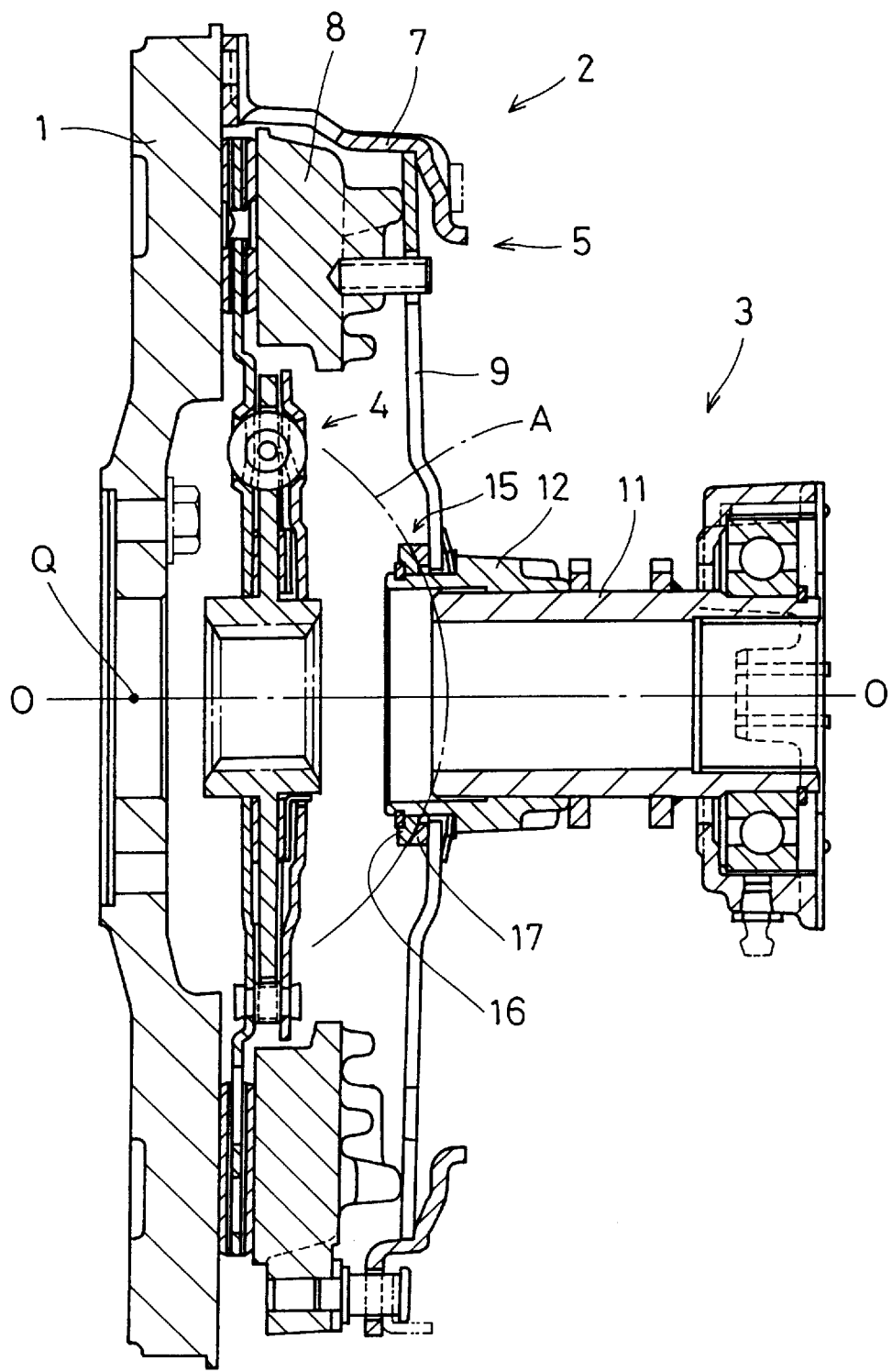
FIG. 1 is a side cross section of a clutch mechanism employing one embodiment of the release mechanism of the present invention.

FIG. 1 shows a pull-type clutch employing an embodiment of the invention. A rotation axis of this pull-type clutch is represented by O—O.

A flywheel 1 is fixed to a crank shaft (not shown) at an engine side. A clutch cover assembly 2 includes a clutch cover 7 fixed to the flywheel 1, a circular or annular pressure plate 8 disposed inside the clutch cover 7, and a diaphragm spring 9. The diaphragm spring 9 has an annular elastic portion, of which outer periphery is elastically seated at its rear side on the clutch cover 7. A radially middle portion of the annular elastic portion elastically pushes the pressure plate 8 toward the clutch disk assembly 4. The diaphragm spring 9 has a plurality of lever portions extending radially inwardly from the annular elastic portion. Ends of the lever portions are coupled to a release device 3, described below.

A central portion of the clutch disk assembly 4 is spline-coupled to a main drive shaft (not shown) extending from a transmission (not shown). A frictional coupling portion which is fixed at the outer peripheral portion of the clutch disk assembly 4 is positioned between the flywheel 1 and the pressure plate 8.

Figure 2:
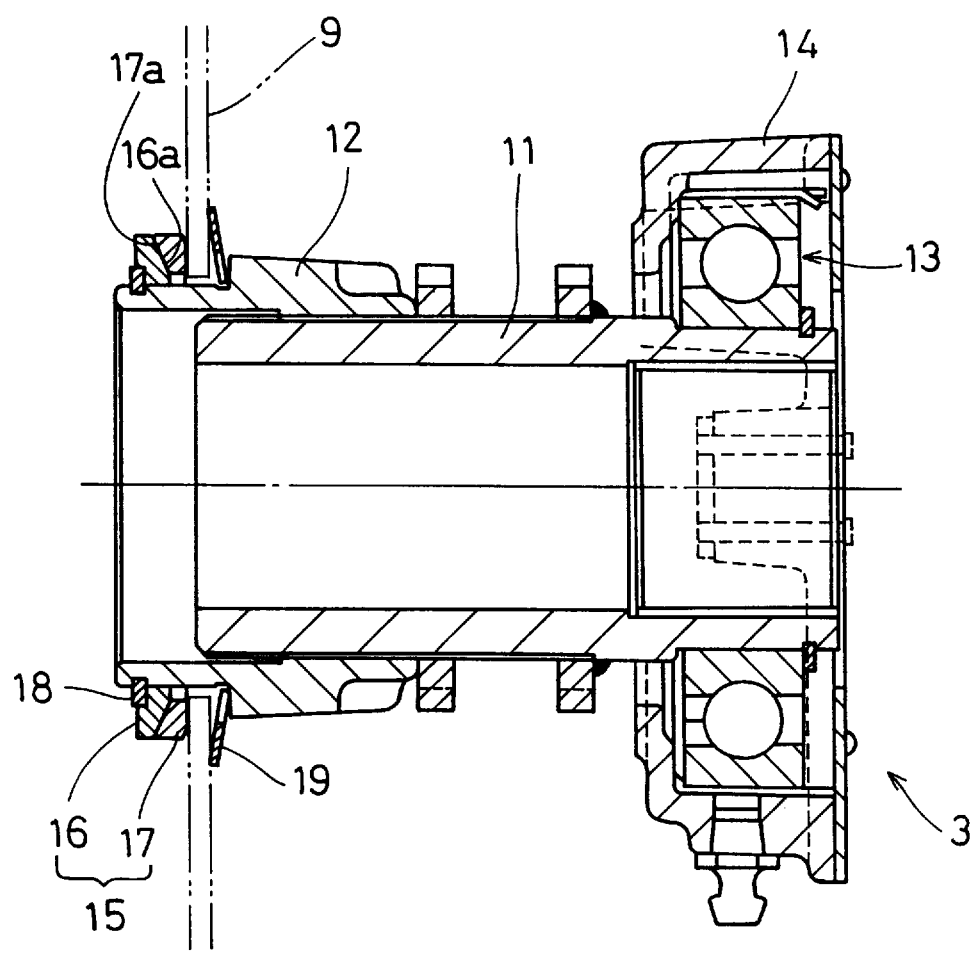
FIG. 2 is a fragmentary cross section view of a portion of FIG. 1, on an enlarged scale, showing details of the release device of the present invention.

As shown more specifically in FIG. 2, the release device 3 is formed of a first sleeve 11, a second sleeve 12, a release bearing 13, a quill 14 and a lever plate 15. The quill 14 is arranged around the main drive shaft (not shown), and is engaged with a release fork (not shown) or the like. An outer race of the release bearing 13 is fixed to the quill 14. An inner race of the release bearing 13 is fixed to the first sleeve 11. The second sleeve 12 is connected to an outer periphery of a portion of the first sleeve 11 near the clutch via screw type threads (not shown) or other similar connecting means. A snap ring 18 is fitted into a groove which is formed around the end of the second sleeve 12 near the clutch.

The lever plate 15 is formed of first and second lever plates 16 and 17. The snap ring 18 prevents the first lever plate 16 from moving toward the clutch. The first lever plate 16 has a spherical convex surface 16a opposed to the transmission. The second lever plate 17 is disposed close to the side of the first lever plate 16 opposed to the transmission. The second lever plate 16 has a spherical concave surface 17a which is in slidable contact with a spherical convex surface 16a. A center of a sphere A defined by the spherical convex surface 16a and the spherical concave surface 17a is located at a point Q at which the flywheel 1 carries the main drive shaft (not shown). The second lever plate 17 is provide at its side opposed to the transmission with a contact surface which is in contact with the ends of the lever portions of the diaphragm spring 9. A predetermined gap is maintained between the inner periphery of the second lever plate 17 and the outer peripheral surface of the second sleeve 12.

A conical spring 19 is disposed between the lever portions of the diaphragm spring 9 and the supporting portion of the second sleeve 12. The conical spring 19 has an inner periphery elastically seated on the second sleeve 12, and thereby forces the lever portions of the diaphragm spring 9 toward the second lever plate 17.

Steps of assembling the clutch will be now be described below. First, the clutch cover assembly 5 and the clutch disk assembly 4 are fixed to the flywheel 1, as shown in FIG. 1. Prior to attaching the clutch cover assembly 5 to the flywheel 1, the second sleeve 12, first lever plate 16, second lever plate 17, conical spring 19 and others are fixed to the ends of the lever portions of the diaphragm spring 9. Then, a transmission housing (not shown) including a main drive shaft (not shown) is moved toward the left side of FIG. 1 toward the clutch cover assembly 5. The first sleeve 11 of the release device 3 is then threaded or screwed into the second sleeve 12.

The transmission may be arranged at an inclined position with respect to the clutch 2 which has been assembled as described above. In this case, the main input shaft (now shown) of the transmission will be inclined with respect to the rotational axis O—O, so that the release bearing 13, quill 14, and first and second sleeves 11 and 12 are inclined. Thereby, the first lever plate 16 slides with respect to the second lever plate 17 about the point Q, so that misalignment is corrected. Thus, a local or shifted load is not applied to the lever plate 15 and the diaphragm spring 9 in spite of the misalignment. Consequently, a generally more even load is applied to the diaphragm spring 9 during clutch engagement and dis-engagement operations. Thereby, members and parts can have an increased life-time, and pedal vibration can be suppressed. In particular, the center of the sphere A defined by the spherical convex surface 16a and the spherical concave surface 17a is configured so that it is coincident with the end of the main drive shaft (not shown), so that the misalignment is corrected more accurately.

According to the release device for the pull-type clutch of the invention, a conventional lever plate is replaced with the two members having spherical surfaces which are in slidable contact with each other. Therefore, it is possible to suppress a local load against members and pedal vibration, which may be caused by a potential misalignment.

Various details of the present invention may be changed without departing from its spirit or its scope. Furthermore, the foregoing description of the embodiments according to the present invention are provided for illustration only, and not for the purpose of limiting the invention as defined by the appended claims and their equivalents.

What is claimed:

1. A release device for a pull-type clutch comprising:
    an axially moveable cylindrical member having first and second ends;
    a first annular lever plate restrained against axial movement with respect to an outer periphery of said first end of said cylindrical member, said first annular lever plate having a spherical convex surface;
    a second annular lever plate having a spherical concave surface in slidable contact with said spherical convex surface, said second annular lever plate being restrained against axial movement proximate said first end of said cylindrical member;

a bearing disposed at said second end of said cylindrical member;

a flywheel defining a central axis; and a clutch cover having a diaphragm spring, said clutch cover being connected to said flywheel, wherein said cylindrical member extends through a central position of said diaphragm spring and said first and second annular lever plates are confined against axial movement between said first end of said cylindrical member and said diaphragm spring with said first and second annular lever plates disposed between said flywheel and said diaphragm spring.

2. The release device for a pull-type clutch as set forth in claim 1 wherein said spherical concave surface and said spherical convex surface have a center point which is defined generally along the central axis of said flywheel and said center point lies radially inside said flywheel.

3. A release device for a pull-type clutch comprising:

an axially moveable cylindrical member having first and second ends;

a first annular lever plate restrained against axial movement with respect to an outer periphery of said first end of said cylindrical member, said first annular lever plate having a spherical convex surface;

a second annular lever plate having a spherical concave surface in slidable contact with said spherical convex surface, said second annular lever plate being restrained against axial movement proximate said first end of said cylindrical member;

a clutch cover having a diaphragm spring, wherein said cylindrical member extends through a central portion of said diaphragm spring and said first and second annular lever plates are confined against axial movement between said first end of said cylindrical member and said diaphragm spring;

a bearing disposed at said second end of said cylindrical member; and a flywheel defining a central axis, said clutch cover being connected to said flywheel, and said first and second annular lever plates are disposed between said flywheel and said diaphragm spring.

4. The release device for a pull-type clutch as set forth in claim 3 wherein said spherical concave surface and said spherical convex surface have a center point which is defined along the central axis of said flywheel and said center point lies radially inside said flywheel.

5. A release device for a pull-type clutch, comprising:

an axially moveable cylindrical member having first and second ends;

a first annular lever plate restrained against axial movement with respect to an outer periphery of said first end of said cylindrical member, said first annular lever plate having a spherical convex surface;

a second annular lever plate having a spherical concave surface in slidable contact with said spherical convex surface, said second annular lever plate being restrained against axial movement proximate said first end of said cylindrical member;

a flywheel defining a central axis;

a clutch cover having a diaphragm spring, said clutch cover being connected to said flywheel, wherein said cylindrical member extends through a central portion of said diaphragm spring and said first and second annular lever plates are confined against axial movement between said first end of said cylindrical member and said diaphragm spring with said first and second annular lever plates disposed between said flywheel and said diaphragm spring;

a bearing disposed at said second end of said cylindrical member; and wherein said spherical concave surface and said spherical convex surface have a center point which is defined along the central axis of said flywheel and said center point lies radially inside said flywheel.

* * * * *